United States Patent Office 3,301,754
Patented Jan. 31, 1967

3,301,754
METHODS AND COMPOSITIONS FOR POTENTIATING CENTRAL NERVOUS SYSTEM DEPRESSANTS
Henry Eugene Jean-Marie Meunier, Grenoble, Isere, France, assignor to Chemetron Corporation, Chicago, Ill., a corporation of Delaware
No Drawing. Filed Oct. 9, 1963, Ser. No. 314,892
Claims priority, application France, Oct. 17, 1962, 912,469
20 Claims. (Cl. 167—65)

This invention relates to novel potentiating agents for central nervous system depressants. More particularly, this invention is concerned with potentiating the sedative, hypnotic and anesthetic effects of well-known depressants by means of dialkyl substituted acetic acid and derivatives thereof.

The compounds of this invention which have been found to be effective in potentiating the effects of central nervous system depressants in warm blooded animals are characterized by the formula

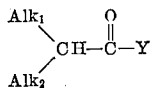

wherein $Alk_1$ is lower alkyl containing 2–7 carbon atoms inclusive and $Alk_2$ is lower alkyl containing 3–7 carbon atoms inclusive both forming straight or branched chain alkyl groups; and wherein Y is an OM group in which M is hydrogen and alkaline metal including sodium and calcium; Y also is an OR radical, wherein R is lower alkyl either straight or branched chained containing 1–5 carbon atoms inclusive; and Y further designates a NHZ group in which Z is hydrogen or carbamyl.

The efficacy and safety of many well-known and widely used anesthetics, hypnotics and sedatives can be greatly increased if their dosages can be reduced with no consequent loss in their potency. Many agents have been investigated for their potentiating effect. Some were found to be effective only in high dosages while of themselves causing side effects. Thus when they are employed as potentiating agents for the central nervous system depressants, they add to the side effects of these drugs. It is also recognized that many well-known potentiating agents are useful in promoting the effects of only one type of central nervous system depressant activity.

It is therefore an object of this invention to provide highly effective, novel potentiating agents for central nervous system depressants. It is also an object of the present invention to provide novel potentiating agents of low toxicity for hypnotics, sedatives and anesthetics. It is a further object of the present invention to provide novel potentiating agents which are effective in enhancing various types of central nervous system depression; such as, anesthesia, hypnosis and sedation. It is still a further object of the present invention to provide potentiators for central nervous system depressants having a chemical configuration entirely different from any of the well-known potentiators.

The compounds of this invention as depicted by the general formula are highly active in potentiating the anesthetic, hypnotic and/or sedative effects of ether and barbiturates such as thiopental sodium and pentobarbital sodium; chlorinated aldehydes such as chloral; and thiazoles such as hemineurine.

The novel potentiating agents can be suitably formulated in physiologoically acceptable carriers such as tablets, suppositories, oil suspensions and solutions, as well as aqueous isotonic solutions. Irrespective of the type of carrier and the route of administration, the dosage of the potentiating agent will vary depending upon its own properties, the basic drug, the nature and duration of the effect desired. The dosage can of course be adjusted by those skilled in the art with consideration being given to the species, age, weight and sex of the recipient when viewed in conjunction with the teachings of the examples contained herein.

All of the compounds useful in the present invention are readily available either from chemical manufacturers or can be prepared according to synthesis described in the literature. To facilitate the obtaining of the novel potentiating agents, should some of them not be readily available, the following literature references to synthesis are given as well as a brief description of the physical characteristics: di-n-propylacetic acid is a colorless liquid and very slightly soluble in water with its synthesis being described by E. Oberreit in Berichte der Deutschen Chemischen Gesellschaft, vol. 29, 1998–2001 (1896); sodium di-n-propylacetate is a white powder, highly soluble in water and can be prepared from the interaction of sodium hydroxide and di-n-propylacetic acid in an aqueous solution; ethyl di-n-propylacetate is an oily liquid which has been prepared by Burton American Chemical Journal 3, 390 (1881); di-n-propylacetamide can be prepared according to the method of Fischer and Dilthey, Berichte der Deutschen Chemischen Gesellschaft, 35, 853 (1902); di-n-propylacetyl urea is a colorless crystalline material and can be prepared according to the method of Fischer and Dilthey in Annalen der Chemie, 335, 367 (1904).

The following examples are presented in order to disclose the invention more fully. It should be understood, however, that they are not intended to limit the invention in any way.

In all of the examples herein, sodium di-n-propylacetate as well as sodium di-n-butylacetate are administered in an aqueous isotonic solution while the other derivatives including di-n-propylacetic acid are administered by dissolving or suspending them in olive oil. The compounding of such solutions requires no special procedures and therefore no details need be set forth.

In Examples I–VI, which are described in Table I, all of the potentiating agents are adminstered intraperitoneally. The concentration of the dosage is adjusted so that the total volume administered is about 1 cc. The method for illustrating the potentiation of sodium 5-ethyl-5-(1-methylbutyl)-2-thiobarbiturate (thiopental sodium) in rabbits by di-n-propylacetic acid and its derivatives is as follows: One establishes a dose of thiopental sodium which never produces sleep in the animal. This dose was found to be 7 mg./kg. by the intravenous route. The rabbits weigh approximately 2 kilos after a 24-hour fast period. The test product is injected into rabbits intraperitoneally at the designated dose. After 30 minutes in Examples I–III and 45 minutes in Examples IV–VI one injects into the marginal vein of the ear the subhypnotic thiopental sodium dose. The duration of sleep is then noted which in the instance of more than one animal is an average time. The animal is considered awakened when it raises his head. This is verified by the normality of the oculopalpebral reflex.

TABLE I.—POTENTIATION OF THIOPENTAL SODIUM

| Example No. | Potentiating Agent | Dose, mg./kg. | No. of Animals | Duration of sleep |
|---|---|---|---|---|
| I | Di-n-propylacetic acid. | 421 / 420 / 300 | 5 / 1 / 4 | 24 min. av. / 23 min. / 14 min., 15 sec. av. |
| II | Di-n-propylacetyl urea. | 533 | 3 | 12 min. av. |
| III | Di-n-propylacetyl-amide. | 100 / 200 / 300 | 2 / 2 / 2 | (*). / (*). / 45 min. av. |
| IV | Ethyl di-n-propylacetate. | 504 | 3 | 48 min. av. |
| V | Sodium di-n-butylacetate. | 50 | 4 | 33 min. av. |
| VI | Sodium di-n-propylacetate. | 300 | 6 | 21 min., 40 sec. av. |

*Sleep-like condition noted with marked muscular relaxation.

EXAMPLE VII

A dog weighing 14 kilos is administered intravenously a 15 mg./kg. dose of thiopental sodium. The animal awakens approximately every ten minutes. Sleep is maintained by injecting 2 mg./kg. four times to maintain sleep. After an intravenous injection of 150 mg./kg. of sodium di-n-propylacetate the dog does not awaken during the entire duration of an experiment lasting 2 hours and 30 minutes.

Examples VIII and IX illustrate the potentiation of diethyl ether in both the guinea pig and mice. In each instance, the animal is placed in a glass bell of 3 liter capacity in which a lateral inlet is provided. Beforehand, the guinea pig is injected intraperitoneally, and the mouse subcutaneously, with the test product at the designated dosage. With a hand nebulizer, 5 ml. of ethyl ether is sprayed in the lateral outlet over a 5-minute period. The duration of sleep is measured by comparison with control animals, with the duration of the ether-produced sleep being remarkably constant in the same lot of animals with the same dose. The animals sleep on their backs and are considered awakened when they spontaneously stand up on their legs.

EXAMPLE VIII

Five guinea pigs were administered a dose of 170 mg./kg. of di-ni-propylacetic acid intraperitoneally. Three animals served as controls. The control animals slept for an average of 4 minutes, while the animals receiving the di-n-propylacetic acid slept for 11 minutes. The potentiation of the ether is therefore 275%.

EXAMPLE IX

Ten mice were administered 170 mg./kg. di-n-propylacetic acid subcutaneously. Three animals served as controls. The control animals slept 2 minutes, while the animals receiving the di-n-propylacetic acid slept for an average 12 minutes 30 seconds. This results is a potentiation of 625%.

EXAMPLE X

This example illustrates the potentiation of sodium 5-ethyl-5-(1-methylbutyl)-barbiturate (pentobarbital sodium) by di-n-propylacetic acid in mice. Beforehand, the minimum dose of the pentobarbital administered subcutaneously is established, the minimum dose being that which causes sleep of 30 minutes minimum and 120 minutes maximum. This dose varies from 30–50 mg./kg. In every instance the animal which has slept the shortest time and the animal which has slept the longest time is eliminated for use in both the control group and the experimental group. The test product is injected subcutaneously 30 minutes before the pentobarbital injection. The mice sleep on their backs and are considered awakened when they stand up spontaneously on their legs. The trembling which occurs occasionally in mice during their sleep is not considered characteristic of awakening.

Four experimental mice were administered a dose of 73.5 mg./kg. and four mice served as controls. Thirty minutes later, pentobarbital sodium is administered subcutaneously in a dosage of 40 mg./kg. One control animal dies without awakening. The average duration of sleep of the other three control mice is 118 minutes. The duration of sleep of the four animals receiving the di-n-propylacetic acid is 306 minutes. This is a potentiation of 260%.

The same procedure was followed as previously described but the dose of sodium pentobarbital was lowered to 30 mg./kg. with five mice receiving di-n-propylacetic acid and five serving as controls. The duration of sleep of the controls is 56 minutes. The duration of sleep of those animals receiving the di-n-propylacetic acid is 152 minutes. Thus, a potentiation of 275% is effected.

Examples XI and XII illustrate the potentiation effect of sodium di-n-propylacetate with respect to trichloroacetaldehyde (chloral) and 4-methyl-5-(beta-chloroethyl thiazole) ethyl sulfate (hemineurine). In each instance the method consists of establishing the onset and measuring the duration of sleep. With certain hypnotics sleep is reinduced by the administration of sodium di-n-propylacetate, after the animals awaken from the sleep caused by the hypnotic. Again the onset of the reinduced sleep and its duration is determined. All of the experiments were carried out on groups of ten Swiss mice, males and females, weighing 22–23 g. Each experiment was repeated three times in order to ascertain that the effects and results were reproducible. A total of 110 mice were employed in Example XI; a total of 60 in Example XII.

EXAMPLE XI

To illustrate the potentiation of chloral, four lots of mice were used according to the following procedure. One control group receives intraperitoneally 325 mg./kg. of chloral in a 5% isotonic solution. A second group receives 50 mg./kg. of sodium di-n-propylacetate one-quarter hour before administration with 325 mg./kg. of chloral. A third group receives 25 mg./kg. of sodium di-n-propylacetate in the same manner as the second group. A fourth group receives 10 mg./kg. of the soduim salt in the same manner as described for the second group, all intraperitoneally.

It should be noted that sodium di-n-propylacetate in the doses used does not possess any hypnotic effect and that chloral at the dose of 325 mg./kg. does not cause sleep in mice. The results are illustrated in Table II.

TABLE II

| Group | Onset of Sleep | Duration of Sleep |
|---|---|---|
| 1 | 0 | 0 |
| 2 | 5 minutes | 2 hours |
| 3 | 5 minutes | 1–1½ hours |
| 4 | 7 minutes | 25 minutes |

A further illustration is given of the effect on sleep and its duration after initial administration of chloral and subsequent administration of sodium di-n-propylacetate. In this experiment, 340 mg./kg. of chloral is injected intraperitoneally in a 5% aqueous isotonic solution which causes sleep for 35 minutes in 80% of the mice. When the mice awaken, they receive 25 mg./kg. of sodium di-n-propylacetate intraperitoneally. In 90% of the animals, sleep reoccurs and lasts 35 minutes. When a dosage of 15 mg./kg. of the sodium compound is administered under the same conditions, sleep reoccurs for 100% of the animals and lasts 23 minutes.

EXAMPLE XII

In this example, three separate tests were made to illustrate the potentiation of hemineurine by sodium di-n-propylacetate.

First, one control group of mice received 225 mg./kg. of hemineurine intraperitoneally. These animals fell asleep in 3–4 minutes with sleep lasting 30 minutes. A second group of mice receive 50 mg./kg. of sodium di-n-propylacetate intraperitoneally one half hour before the injection of the 225 mg./kg. of hemineurine. The mice in this group fall asleep as the controls but sleep lasts for two hours.

Second, the hemineurine dose is lowered below the hynotic level to 175 mg./kg. and the sodium di-n-propylacetate dose is maintained in another group and increased in still a further group. In the group receiving 175 mg./kg. of hemineurine intraperitoneally, none of the animals falls asleep. In another group receiving 200 mg./kg. of sodium di-n-propylacetate intraperitoneally one-half hour before the 175 mg./kg. of the hemineurine, 70% of the mice fall asleep in 4–5 minutes with sleep lasting for 20 minutes. In a further group of mice receiving 50 mg./kg. of sodium di-n-propylacetate intraperitoneally one-half hour before the 175 mg./kg. of hemineurine, 60% of the mice fall asleep in 4–5 minutes with sleep lasting 5 minutes.

In still another test, a group of mice are put to sleep with 225 mg./kg. of hemineurine administered intraperitoneally. When they awaken, namely, when the mice maintain for less than 5 seconds a dorsal position, 15 mg./kg. of sodium di-n-propylacetate is administered intraperitoneally. As a result, 70% of the animals fall asleep again in 10 minutes with the second sleep lasting 30 minutes.

In the foregoing examples the potentiating compound is administered before or after the depressant drug is given. If desired, the potentiating compound and the drug can be administered simultaneously to effect the same result. A dosage formulation for simultaneous administration is depicted in Example XIII.

EXAMPLE III

*Sodium di-n-propylacetate-pentobarbital sodium tablets*

In illustration of a tablet dosage, 1000 tablets each containing 100 mg. of sodium di-n-propylacetate and 30 mg. of pentobarbital sodium were prepared by mixing together 100 grams of sodium di-n-propylacetate and 30 grams of pentobarbital sodium, three grams of corn starch and 15 cc. of water. The granulation is forced through a screen and dried. To the dried material is added five grams of talc and two grams of magnesium stearate as lubricants and twelve grams of additional corn starch as a disintegrator. The material thus prepared is compressed into 1000 tablets each containing 130 mg. of active material. The tablets can be scored as desired so that they can be easily broken in half.

The novel potentiating agents can be formulated alone according to the procedure outlined in the foregoing example. The amounts and types of excipients of course will vary according to the physical properties of the compound whether combined with the depressant drug or not.

The neurotoxicity ($TD_{50}$) of sodium di-n-propylacetate has been determined as being 1165 mg./kg. with 95% fiducial limits of 793–1713. These calculations were made in conjunction with the investigation of the anticonvulsant activity of the sodium salt which is the subject of copending application Serial No. 265,371, filed March 15, 1963. The $TD_{50}$ is calculated on a statistical basis employing a significant number of mice which were given various doses of sodium di-n-propylacetate and tested at a predetermined time of peak action, until at least three points were established in the range between 0 and 100% minimum neurotoxicity. The results are then plotted on a logarithmic probability paper and a regression line fitted to the plotted points.

The $LD_{50}$ of sodium di-n-propylacetate is 1700 mg./kg. with 1546–1870 95% fiducial limits. The $LD_{50}$ is manifested by the single dose of the compound which was fatal to 50% of the tested animals within 24 hours. A total of 42 mice were employed to make the determination.

Sub-acute and chronic toxicity studies were carried out in guinea pigs and Swiss mice by the oral route (stomach tube) in various dosage levels over long periods of time. Blood studies were performed during the experiment. At the end of the study animals were sacrificed and examined. The macroscopical examination of the organs did not disclose any lesions. Histological examination of the tissue was performed on the kidneys, adrenals, lungs, brain, stomach and liver. No anomaly whatsoever was found.

The weight curves of the experimental animals were comparable with those of the control animals. These experiments permit the conclusion that the product possesses a satisfactory therapeutic margin.

In the foregoing examples, certain derivatives of acetic acid have been described. It should be understood that all of the derivatives described in the general formula can be employed in a like manner. Specifically, the following compounds can be utilized according to the teachings in the examples: 2-isopropyl-valeric acid which has been prepared by E. Fischer, Holzapfel and Gwinner, Berichte der Deutschen Chemischen Gesellschaft, vol. 45, page 256; di-n-butylacetic acid prepared by Levene and Cretcher, Journal of Biochemical Chemistry, vol. 33, page 508; ethyl-sec.-butylacetic acid, synthesized by Doran and Shank, in Journal of Organic Chemistry, vol. 5, p. 195; ethyl-(1-methylbutyl)acetic acid prepared by Coke and McElvain, JACS, vol. 54, page 4323; and dihexylacetic acid described by Armendt and Adams, JACS, vol. 52, page 1290. It should be understood that the alkali metal salts of the acids disclosed herein, whether such acids are in the salt or ester form, can be employed according to the teachings of this invention. Such alkali metal salts include sodium, potassium and lithium. The lower alkyl esters of the acids containing a total of 1–5 carbon atoms can also be employed whether straight or branched chained including the methyl, normal or isopropyl, normal or isobutyl and pentyl esters. Also, the urea and the amide derivatives of the acids can in a like manner be utilized.

Certain literature references have been given with respect to specific compounds. By obvious adaptations of these methods, all of the compounds described herein can be prepared. The esters can be prepared by known procedures from the acids by means of the corresponding alcohols. The urea and the amides can likewise be prepared, for example, by known methods from the acids by converting them to the acid chloride and further reacting with urea and ammonia, respectively.

It will thus be seen from the foregoing description of the present invention that there are now provided novel and highly effective potentiating agents for drugs producing central nervous system depression. These potentiating agents act rapidly, promote a long duration of the depressant effect, with certain central nervous system depressants and reinduce sleep without an additional dose of the hypnotic. Further, the potentiating agents are active with various kinds of depressants and are of low toxicity. Still further, the potentiating agents of the present invention have a chemical configuration different from any of those known previously.

Others may readily adapt the invention for use under various conditions of service by employing one or more of the novel features disclosed or equivalents thereof. All such which do not depart from the spirit of this disclosure are intended to be within its scope, which at present advised is best defined in the appended claims.

I claim:
1. A method for potentiating the activity of the central nervous system depression of ethers, barbiturates, chlorinated aldehydes or thiazoles comprising administering to a warm-blooded animal undergoing central nervous system depressant therapy in an amount sufficient to potentiate said central nervous system depressants, a compound of the formula

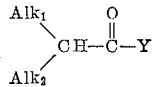

wherein $Alk_1$ is lower alkyl containing 2–7 carbon atoms inclusive, $Alk_2$ is lower alkyl containing 3–7 carbon atoms inclusive; Y is selected from the group consisting of OM, OR and NHZ groups, M is selected from the group consisting of hydrogen, and alkali metals, R is lower alkyl containing 1–5 carbon atoms inclusive, and Z is selected from the group consisting of hydrogen and carbamyl.

2. A method for potentiating the central nervous system depression of ethers, barbiturates, chlorinated aldehydes or thiazoles comprising administering to a warm-blooded animal undergoing central nervous system depressant therapy in an amount sufficient to potentiate said central nervous system depressants, a compound of the formula

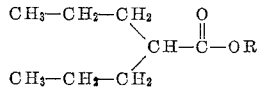

wherein R is lower alkyl containing 1–5 carbon atoms inclusive.

3. A method for potentiating the central nervous system depression of ethers, barbiturates, chlorinated aldehydes and thiazoles comprising administering to a warm-blooded animal undergoing central nervous system depressant therapy in an amount sufficient to potentiate said central nervous system depressants, a compound of the formula

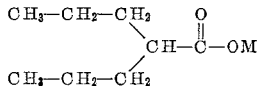

wherein M is alkali metal.

4. A method for potentiating the central nervous system depression of barbiturates comprising administering to a warm-blooded animal undergoing central nervous system depressant therapy in an amount sufficient to potentiate the central nervous system depression of said barbiturate, a compound of the formula

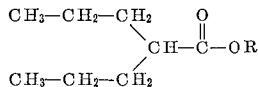

wherein R is lower alkyl containing 1–5 carbon atoms inclusive.

5. A method for potentiating the central nervous system depression of barbiturates comprising administering to a warm-blooded animal undergoing central nervous system depressant therapy in an amount sufficient to potentiate the central nervous system depression of said barbiturates, a compound of the formula

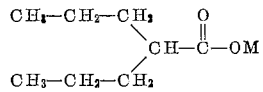

wherein M is alkali metal.

6. A method for potentiating the central nervous system depression of ethyl ether comprising administering to a warm-blooded animal undergoing central nervous system depressant therapy di-n-propylacetic acid in an amount sufficient to potentiate the central nervous system depression of said ether.

7. A method for potentiating the central nervous system depression of ethyl ether comprising administering to a warm-blooded animal undergoing central nervous system depressant therapy sodium di-n-propylacetate in an amount sufficient to potentiate the central nervous system depression of said ether.

8. A method for potentiating the central nervous system depression of sodium 5-ethyl-5-(1-methylbutyl)-2-thiobarbiturate comprising administering to a warm-blooded animal undergoing central nervous system depressant therapy di-n-propylacetic acid in an amount sufficient to potentiate the central nervous system depression of said thiobarbiturate.

9. A method for potentiating the central nervous system depression of sodium 5-ethyl-5-(1-methylbutyl)-2-thiobarbiturate comprising administering to a warm-blooded animal undergoing central nervous system depressant therapy sodium di-n-propylacetate in an amount sufficient to potentiate the central nervous system depression of said thiobarbiturate.

10. A method for potentiating the central nervous system depression of sodium 5-ethyl-5-(1-methylbutyl)-barbiturate comprising administering to a warm-blooded animal undergoing central nervous system depressant therapy di-n-propylacetic acid in an amount sufficient to potentiate the central nervous system depression of said barbiturate.

11. A method for potentiating the central nervous system depression of sodium 5-ethyl-5-(1-methylbutyl)-barbiturate comprising administering to a warm-blooded animal undergoing central nervous system depressant therapy sodium di-n-propylacetate in an amount sufficient to potentiate the central nervous system depression of said barbiturate.

12. A method for potentiating the central nervous system depression of 5-ethyl-5-(1-methylbutyl)-2-thiobarbiturate comprising administering to a warm-blooded animal undergoing central nervous system depressant therapy di-n-propylacetylamide in an amount sufficient to potentiate the central nervous system depression of said thiobarbiturate.

13. A method for potentiating the central nervous system depression of trichloroacetaldehyde comprising administering to a warm-blooded animal undergoing central nervous system depressant therapy di-n-propylacetic acid in an amount sufficient to potentiate the central nervous system depression of said aldehyde.

14. A method for potentiating the central nervous system depression of trichloroacetaldehyde comprising administering to a warm-blooded animal undergoing central nervous system depressant therapy sodium di-n-propylacetate in an amount sufficient to potentiate the central nervous system depression of said aldehyde.

15. A method for potentiating the central nervous system depression of 4-methyl-5-(beta-chloroethylthiazole) ethyl sulfate comprising administering to a warm-blooded animal undergoing central nervous system depressant therapy di-n-propylacetic acid in an amount sufficient to potentiate the central nervous system depression of said thiazole.

16. A method for potentiating the central nervous system depression of 4-methyl-5-(beta-chloroethylthiazole) ethyl sulfate comprising administering to a warm-blooded animal undergoing central nervous system depressant therapy sodium di-n-propylacetate in an amount sufficient to potentiate the central nervous system depression of said thiazole.

17. A therapeutic composition possessing potentiating activity for a central nervous system depressant comprising ethers, barbiturates, chlorinated aldehydes or thiazoles and a compound of the formula

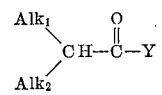

wherein $Alk_1$ is lower alkyl containing 2–7 carbon atoms inclusive, $Alk_2$ is lower alkyl containing 3–7 carbon atoms inclusive; Y is selected from the groups consisting of OM, OR and NHZ groups, M is selected from the group consisting of hydrogen, and alkali metals, R is lower alkyl containing 1–5 carbon atoms inclusive, and Z is selected from the group consisting of hydrogen and carbamyl and a physiologically acceptable carrier for said compound and said depressant.

18. A therapeutic composition possessing potentiating activity for a central nervous system depressant comprising ethers, barbiturates, chlorinated aldehydes or thiazoles and a compound of the formula

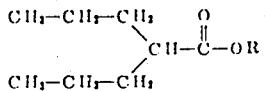

wherein R is lower alkyl containing 1–5 carbon atoms inclusive, and a physiologically acceptable carrier for said compound and said depressant.

19. A therapeutic composition possessing potentiating activity for a central nervous system depressant comprising ethers, barbiturates, chlorinated aldehydes or thiazoles and a compound of the formula

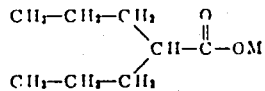

wherein M is alkali metal, and a physiologically acceptable carrier for said compound and said depressants.

20. A therapeutic composition for potentiating the activity of the depression of ethers barbiturates, chlorinated aldehydes or thiazoles comprising a compound of the formula

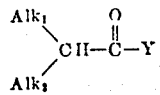

wherein $Alk_1$ is lower alkyl containing 2–7 carbon atoms inclusive, $Alk_2$ is lower alkyl containing 3–7 carbon atoms inclusive; Y is selected from the group consisting of OM, OR and NHZ groups, M is selected from the group consisting of hydrogen, and alkali metals, R is lower alkyl containing 1–5 carbon atoms inclusive, and Z is selected from the group consisting of hydrogen and carbamyl and a physiologically acceptable carrier for said compound.

References Cited by the Examiner

Chem. Abst. vol. 35, p. 1865[(3)], 1941.

Merck Index (7th edition, 1960), pp. 233, 430, 783, 540, 1039 and 1059. (Copy in POSL.)

PDR 1960, Medical Economics, Inc., Oradell, N.J. (p. 785 relied on.) (Copy in POSL.)

JULIAN S. LEVITT, *Primary Examiner.*

N. MANN, S. J. FRIEDMAN, *Assistant Examiners.*

UNITED STATES PATENT OFFICE

CERTIFICATE OF CORRECTION

Patent No. 3,301,754                           January 31, 1967

Henry Eugene Jean-Marie Meunier

It is hereby certified that error appears in the above numbered patent requiring correction and that the said Letters Patent should read as corrected below.

Column 3, line 50, for "di-ni-propylacetic" read -- di-n-propylacetic --; line 61, for "is" read -- in --; column 5, line 42, for "EXAMPLE III" read -- EXAMPLE XIII --; column 8, line 75, for "groups" read -- group --; column 10, line 2, after "of" strike out "the" and insert instead -- central nervous system --; same line 2, for "ethers" read -- ethers, --.

Signed and sealed this 10th day of October 1967.

(SEAL)
Attest:

Edward M. Fletcher, Jr.
Attesting Officer

EDWARD J. BRENNER
Commissioner of Patents